A. Holbrook,
Loom-Pickers.
Nº 1,766.
" 32,770.
Patented Jul. 9. 1861.
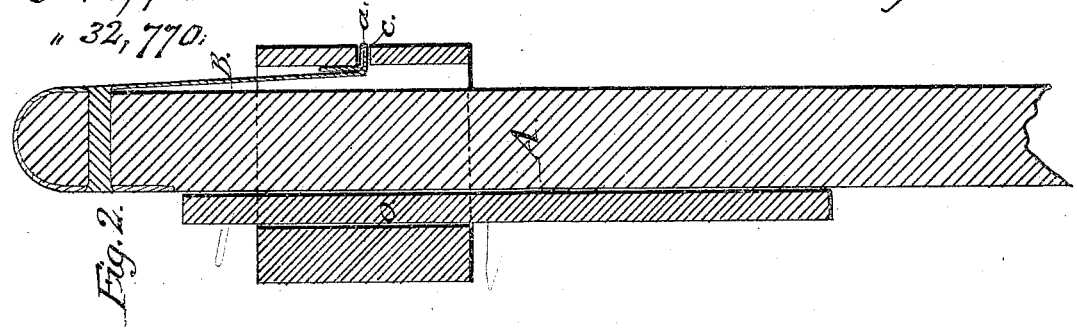
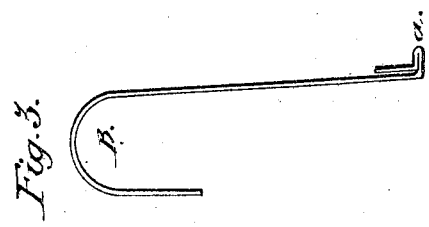
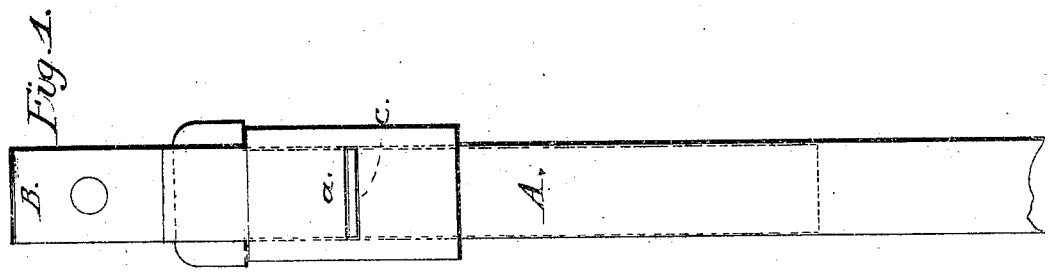
Witnesses:
Henry Martin
George W. Adams
Inventor:
Albert Holbrook

UNITED STATES PATENT OFFICE.

ALBERT HOLBROOK, OF PROVIDENCE, RHODE ISLAND.

PICKER.

Specification of Letters Patent No. 32,770, dated July 9, 1861.

*To all whom it may concern:*

Be it known that I, ALBERT HOLBROOK, of the city and county of Providence and State of Rhode Island, have invented a new and useful Improvement in Applying Pickers to Picker-Staffs; and I do hereby declare the same to be fully described in the following specification and illustrated in the accompanying drawings, of which—

Figure 1, denotes a rear end elevation of a picker staff as constructed in accordance with my invention; Fig. 2, a vertical and longitudinal section of the same; Fig. 3, a side view of the spring.

The nature of my invention consists in dispensing with the use of screws nails &c., and confining the picker to the picker staff by means of a spring formed and applied to the said staff, and operating with a slot in the said picker in manner as will be hereinafter set forth.

It is a fact well known that an easy, simple and effective method of applying a box picker to a picker staff and detaching it therefrom as circumstances may require, is a desideratum which has long existed. The usual practice of confining the picker to the staff by means of screws nails &c. is very objectionable as by the concussion or vibration of the picker the heads of the nails or screws soon commence wearing upon the picker and render it loose, and besides the nails or screws driven into the picker staff weaken it often causing it to split.

My object in inventing my improvement has been to remedy these evils and this I do by dispensing with the use of nails or screws and employing a spring in lieu thereof.

In the drawings A, denotes the top part of a picker staff the same having a bent spring B, attached to its back side and extending down a short distance as seen in Fig. 2. The lower part of the spring is bent at a right angle or thereabout to the main part so as to form a catch $a$, to operate in connection with a slot $c$, formed transversely of the picker in manner as shown in Fig. 1. By such an application or arrangement of the spring with respect to the picker the latter is held firmly in place without danger of becoming loose as is often the case when the picker is applied to the staff by means of screws or nails.

My improvement is not only very simple but it enables a picker to be readily attached to the staff or detached therefrom without any liability of injuring it.

O, is a leather wedge which is placed between the picker and staff the same being not only for the purpose of maintaining a proper tension of the spring, but to prevent the front part of the picker staff from injury.

I do not claim broadly applying a rawhide picker to a picker staff, but I claim my improved mode of applying it viz. by means of a spring lever provided with a catch $a$, operating with the slot $o$, of the picker in manner as represented and for the purpose set forth.

ALBERT HOLBROOK.

Witnesses:
HENRY MARTIN,
GEORGE W. ADAMS.